(12) United States Patent
Boesmann et al.

(10) Patent No.: US 9,062,899 B2
(45) Date of Patent: Jun. 23, 2015

(54) PAIRS OF WORKING SUBSTANCES FOR ABSORPTION HEAT PUMPS, ABSORPTION REFRIGERATION MACHINES AND HEAT TRANSFORMERS

(75) Inventors: Andreas Boesmann, Stegen (DE); Thomas J. S. Schubert, Freiburg (DE)

(73) Assignee: BASF SE (DE)

( * ) Notice: Subject to any disclaimer, the term of this patent is extended or adjusted under 35 U.S.C. 154(b) by 1392 days.

(21) Appl. No.: 11/579,908

(22) PCT Filed: May 23, 2005

(86) PCT No.: PCT/EP2005/005570
§ 371 (c)(1),
(2), (4) Date: Nov. 8, 2006

(87) PCT Pub. No.: WO2005/113702
PCT Pub. Date: Dec. 1, 2005

(65) Prior Publication Data
US 2008/0028777 A1 Feb. 7, 2008

(30) Foreign Application Priority Data
May 21, 2004 (DE) .......................... 10 2004 024 967

(51) Int. Cl.
*C09K 5/00* (2006.01)
*F25B 15/00* (2006.01)
*C09K 5/04* (2006.01)

(52) U.S. Cl.
CPC ................ *F25B 15/00* (2013.01); *C09K 5/047* (2013.01); *Y02B 30/62* (2013.01)

(58) Field of Classification Search
USPC .......................... 252/69; 62/483, 117; 203/14
See application file for complete search history.

(56) References Cited

U.S. PATENT DOCUMENTS

| 3,626,716 | A | 12/1971 | Leonard |
| 3,638,452 | A | 2/1972 | Kruggel |
| 7,435,318 | B2 * | 10/2008 | Arlt et al. .......................... 203/14 |
| 2005/0115252 | A1 * | 6/2005 | Karlsson et al. ................ 62/141 |

FOREIGN PATENT DOCUMENTS

| DE | 3623680 A1 | 1/1988 | |
| DE | 101 00 395 A1 | 1/2002 | |
| EP | 0012856 A * | 7/1980 | ............... B01J 19/00 |
| EP | 0012856 A1 * | 7/1980 | ............... B01J 19/00 |
| WO | WO-2004/090066 A1 | 10/2004 | |
| WO | WO 2004090066 A1 * | 10/2004 | |

OTHER PUBLICATIONS

Heat Pumps, Heat Transformers-Introduction, Feb. 12, 2009, http://ec.europa.eu/energy/atlas/html/body_hptorint.html, p. 1-3.*
D. Seher, Forschungsberichte des Deutschen Kalte-u. Klimatechnischen Vereins Nr. 16, 1985, pp. 1-143.
De Lucas et al., "Performance evaluation and simulation of a new absorbent for an absorption refrigeration system," *International Journal of Refrigeration*, vol. 27, 2004, pp. 324-330.
Kearney et al., "Engineering Aspects of a Molten Salt Heat Transfer Fluid in a Trough Solar Field," *11th Solar PACES International Symposium on Concentrated Solar Power and Chemical Energy Technologies*, Sep. 4-6, 2002, pp. 503-508.
Wu et al., "Novel Ionic Liquid Thermal Storage for Solar Thermal Electric Power Systems," *Proceedings of Solar Forum* 2001, Apr. 21-25, 2001.
R. Hengerer, "Untersuchung des ternaren Gemisches Trifluorethanol-Wasser-Tetraethylenglykoldimethylether als Arbeitsstoffgemisch fur Warmetransformatoren," *Universitat Stuttgart*, 1991. (Table of Contents).
A.O. Genssle, "Warmetransformation mit dem Arbeitsstoffpaar Trifluorethanol-Tetraethylenglykol-dimethylether," *Fortschritt-Berichte VDI*, Nr. 130, Reihe 19, VDI Verlag, 2001. (Table of Contents).
P. Wasserscheid et al. (ed), *Ionic Liquids in Synthesis*, Wiley-VCH, 2003 (Table of Contents).
R.D. Rogers et al. (ed), *Green Industrial Applications of Ionic Liquids, Nato Science Series II, Mathematics, Physics and Chemistry*, vol. 92, 2003. (Table of Contents).
R.D. Rogers et al. (ed), *Ionic Liquids: Industrial Applications for Green Chemistry, ACS Symp. Series* 818, 2002. (Table of Contents).

* cited by examiner

*Primary Examiner* — Monique Peets
(74) *Attorney, Agent, or Firm* — Drinker Biddle & Reath LLP

(57) ABSTRACT

A working substance pairing comprising a working substance and an ionic liquid, its use in absorption heat pumps, absorption refrigeration machines and heat transformers and also corresponding apparatuses.

14 Claims, No Drawings

PAIRS OF WORKING SUBSTANCES FOR ABSORPTION HEAT PUMPS, ABSORPTION REFRIGERATION MACHINES AND HEAT TRANSFORMERS

CROSS-REFERENCE TO RELATED APPLICATIONS

This application is a National Stage entry under 35 USC § 371 of PCT/EP2005/005570, filed May 23, 2005, which claims priority to German Application No. 10 2004 024 967.9, filed May 21, 2004. The entire contents of each of the above-applications are incorporated herein by reference The present invention relates to novel working substance pairings for absorption heat pumps, absorption refrigeration machines and heat transformers.

Absorption circuits in principle offer excellent opportunities for rational energy utilization in heating and cooling and in heat recovery, with only a minimal input of high-grade electric energy for the operation of liquid pumps being required.

Particularly practical and forward-looking applications of this technology are in the air-conditioning of buildings by means of renewable types of energy such as solar energy or geothermal energy and in the utilization or recovery of waste heat from many industrial processes.

A distinction can be made between two variants of a circuit:
1. Absorption heat pumps (AHPs) and absorption refrigeration machines (ARMs) In this process variant, heat is supplied at a relatively high temperature level (driving heat) to the cyclic process, heat is released at an intermediate temperature level (heating heat) and heat is taken up at a low temperature level from the environment (cooling of the environment). AHPs and ARMs differ only in the different temperature levels at which heat is taken up from the environment and thus cooling takes place in the environment, i.e. "cold" is generated.
2. Absorption heat transformer (AHT) In this process variant, heat obtained at an intermediate temperature level is introduced into the cyclic process, part of it is transformed to a higher temperature level and released as useful heat. The other part of the heat supplied is released at a low temperature level to the environment.

Typical temperature levels for absorption processes are as follows:
upper temperature 80-150° C.
intermediate temperature 50-80° C.
lower temperature −20-20° C. (temperatures below 0° C. only in the case of AHPs)

Absorption processes for the transformation of heat have been known and implemented industrially for over 100 years (e.g. U.S. Pat. Nos. 3,638,452, 3,626,716, DE 101 003 95). Nevertheless, this technology has not found wide use to the present day, although there is an increasing search for practical methods of using energy rationally especially within the framework of the increasing discussion of energy and climate problems.

The main reason for this is the lack of technically efficient, nonhazardous and operationally reliable working substance pairings (volatile working substance—absorption medium) for this type of processes.

In many research studies, new possible pairs of working substances have been examined time and time again and processes have been modeled and simulated using the mix data determined (see D. Seher, Forschungsberichte des Deutschen Kälte- und Klimatechnischen Vereins, No. 16, 1985; R. Hengerer, Dissertation Universität Stuttgart, 1991; A. O. Genssle, Fortschriff-Berichte VDI, Series 19, No. 130, VDI Verlag 2001; A. D. Lucas et al., Int. Journal of Refrigeration 27 (2004) 324-330).

Criteria for optimal working substance pairings for absorption heat pumps, absorption refrigeration machines and heat transformers can, according to the abovementioned references, be formulated as follows:
nontoxic and not explosive
chemical resistance up to about 150° C.
high enthalpy of vaporization of the working medium, e.g. water
high solubility of the working medium in the absorption medium
significant vapor pressure depression of the working medium on dissolution in the absorption medium
vanishingly low vapor pressure of the absorption medium
very complete miscibility of the working medium and the absorption medium
good thermal conductivity of the working medium and of the absorption medium
low viscosity of the absorption medium and the mixture of the working medium and the absorption medium
neither the working medium nor the absorption medium can be corrosive.

Finally, only two systems (working substance pairings) have to the present day become established for practical operation of absorption plants, namely lithium bromide/water and ammonia/water, with the latter being used predominantly in ARMs. All substance pairings comprising organic components which have been examined hitherto have been rejected for technical, ecological or safety reasons.

However, the two systems which are mainly used have serious disadvantages.

Thus, in the case of the system ammonia/water, a rectifier is required in the absorption circuit in order to achieve virtually complete separation of the two substances because of the volatility of the absorption medium water, and this reduces the overall efficiency of the process. In addition, the pressure which is required for condensing ammonia is relatively high, so that the plant has to be designed to withstand the appropriate pressure.

The working substance pairing lithium bromide/water has, like all systems comprising inorganic salts, a pronounced miscibility gap. If the lower temperature level is too low, the salt can crystallize out from the solution and damage the plant by blocking lines, valves and pumps. To avoid this, only a little water is taken off from the solution so that the concentration of the lithium bromide is not increased too much. As a result, the outgassing range decreases and as a result decreases the efficiency of the plant. Apart from this effect, the performance of the apparatus is additionally reduced by a relatively large amount of water having to be transported as solvent for the absorption medium between stripper and absorber and having to be cooled. In addition, the concentrated aqueous solution of lithium bromide is very corrosive at elevated temperatures, which forces the use of special materials of construction. A. D. Lucas et al. (Int. Journal of Refrigeration 27 (2004) 324-330) therefore proposes using a salt mixture of lithium bromide and potassium formate in order to reduce these problems. However, the problems mentioned can only be alleviated within narrow limits in this way. This system, too, has not become established in industry.

The disadvantages of the working substance pairings examined hitherto are essentially poor absorption of the working substance in the absorption medium, the incomplete miscibility of the working substance with the absorption medium and the volatility of the absorption medium. In addition, severe corrosion phenomena on materials of construction occur in many cases, which makes the use of these working substance pairings more difficult.

It was an object of the present invention to discover working substance pairings which are suitable for use in absorption heat pumps, absorption refrigeration machines and/or heat transformers and do not have the disadvantages mentioned.

A further object was to find an absorption medium which has a vapor pressure which is sufficiently low to avoid problems in the separation of substances, is stable at the temperatures to be expected, has unlimited miscibility with the working substance, e.g. water or ammonia, and can absorb this in a suitable way. In addition, it is advantageous to find an absorption medium which is liquid in the entire temperature range under consideration in order to prevent crystallization problems and also to enable all of the working substance, e.g. water or ammonia, present in the absorption medium to be taken off and utilized.

Ionic liquids have been known since the end of the 1940s. These are salt melts which are preferably liquid at room temperature and temperatures below room temperature and represent a new class of solvents having a nonmolecular, ionic character. A customary definition of ionic liquids which distinguishes them from known salt melts is a melting point below 80° C. Other references give a melting point below room temperature for this purpose. For the purposes of the present patent application, ionic liquids are salts which in the pure state have a melting point below 80° C., preferably below room temperature.

Typical cation/anion combinations which lead to ionic liquids are, for example, dialkylimidazolium, pyridinium, ammonium and phosphonium with halide, tetrafluoroborate, methylsulfate. In addition, many further combinations of cations and anions which lead to low-melting salts are conceivable.

This class of substances has the following properties:
good solvent capabilities for many substances
virtually no vapor pressure (therefore no azeotrope formation)—incombustibility
wide liquid range from −60° C. to 400°

Overviews of ionic liquids, their preparation, properties and use may be found, for example, in: Ionic Liquids in Synthesis, P. Wasserscheid, T. Welton (eds), Wiley; Green Industrial Applications on ionic Liquids (NATO Science Series. Ii. Mathematics, Physics and Chemistry, 92); Ionic Liquids "Industrial Applications for Green Chemistry" (ACS Symposium Series, 818) by Robin D. Rogers (Editor).

Working substance pairings comprising a working substance and an ionic liquid have now been found. Furthermore, it has been found that ionic liquids can be used as absorption medium in absorption heat pumps, absorption refrigeration machines and heat transformers. The present invention is likewise directed at absorption heat pumps, absorption refrigeration machines and heat transformers which comprise a working substance and an ionic liquid as working substance pairing.

Working substance pairing comprising
A) a working substance;
B) an ionic liquid.

For the purposes of the present invention, ionic liquids are preferably salts of the general formula I, II, III B1) $[A]_n^+[Y]^{n-}$ (I)

where n is 1, 2, 3 or 4, $[A]^+$ is a quaternary ammonium cation, an oxonium cation, a sulfonium cation or a phosphonium cation and $[Y]^{n-}$ is a monovalent, divalent, trivalent or tetravalent anion;

B2) mixed salts of the general formulae (II)

$[A^1]^+[A^2]^+[Y]^{2-}$ (IIa);

$[A^1]^+[A^2]^+[A^3]^+[Y]^{3-}$ (IIb); or $[A^1]^+[A^2]^+[A^3]^+[A^4]^+[Y]^{4-}$ (IIc), where $[A^1]^+$, $[A^2]^+$, $[A^3]^+$ and $[A^4]^+$ are selected independently from among the groups mentioned for $[A]^+$ and $[Y]^{n-}$ is as defined under B1); or B3) mixed salts of the general formulae (III)

$[A^1]^+[A^2]^+[A^3]^+[M^1]^+[Y]^{4-}$ (IIIa);

$[A^1]^+[A^2]^+[M^1]^+[M^2]^+[Y]^{4-}$ (IIIb);

$[A^1]^+[M^1]^+[M^2]^+[M^3]^+[Y]^{4-}$ (IIIc);

$[A^1]^+[A^2]^+[M^1]^+[M^1]^+[Y]^{4-}$ (IIId);

$[A^1]^+[M^1]^+[M^2]^+[Y]^{3-}$ (IIIe);

$[A^1]^+[M^1]^+[Y]^{2-}$ (IIIf);

$[A^1]^+[A^2]^+[M^4]^{2+}[Y]^{4-}$ (IIIg);

$[A^1]^+[M^1]^+[M^4]^{2+}[Y]^{4-}$ (IIIh);

$[A^1]^+[M^1]^{3+}[Y]^{4-}$ (IIIi); or $[A^1]^+[M^4]^{2+}[Y]^{3-}$ (IIIj)

where $[A^1]^+$, $[A^2]^+$ and $[A^3]^+$ are selected independently from among the groups mentioned for $[A]^+$, $[Y]^{n-}$ is as defined under B1) and $[M^1]^+$, $[M^2]^+$, $[M^3]^+$ are monovalent metal cations, $[M^4]^{2+}$ is a divalent metal cation and $[M^5]^{3+}$ is a trivalent metal cation;

or mixtures thereof;

which have a melting point of ≤180° C.

For the purposes of the present invention, working substances are organic or inorganic liquids whose enthalpies of vaporization are ≥400 KJ/kg, preferably water, ammonia, methanol or chlorofluorocarbons such as Freons, Frigen.

Preference is here given to working substances such as water, methanol or ammonia, in particular ammonia.

The ionic liquids preferably have a melting point of ≤150° C.; in particular ≤80° C.

In a further preferred embodiment, the ionic liquids have a melting point in the range from −50° C. to 150° C., in particular in the range from −20° C. to 120° C.

In a further preferred embodiment, the ionic liquids have a melting point of ≤80° C., in particular ≤room temperature.

Preference is also given to ionic liquids in which the cation $[A]^+$ is preferably a quaternary ammonium cation which generally comprises from 1 to 5, preferably from 1 to 3 and particularly preferably 1 or 2, nitrogen atoms.

Suitable cations are, for example, the cations of the general formulae (IVa) to (IVw)

(IVa)
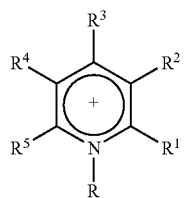
(IVb)
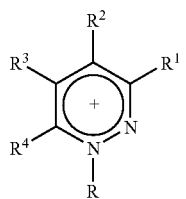
(IVc)
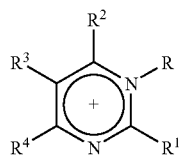
(IVd)
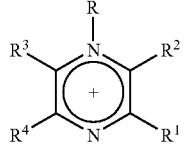
(IVe)
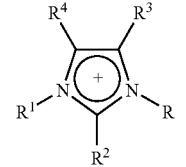
(IVf)
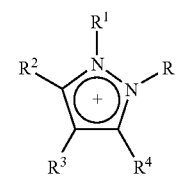
(IVg)
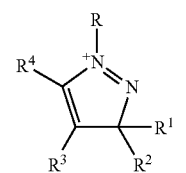
(IVg')
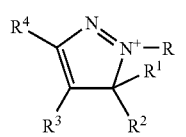
(IVh)
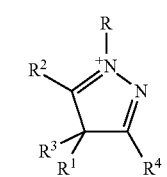
-continued
(IVi)
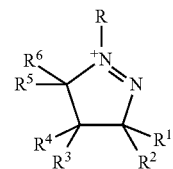
(IVj)
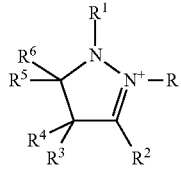
(IVj')
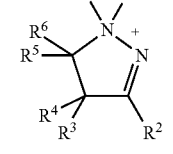
(IVk)
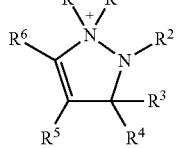
(IVk')
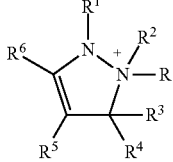
(IVl)
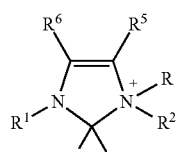
(IVm)
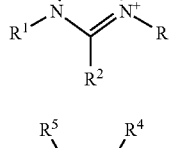
(IVm')
(IVn)
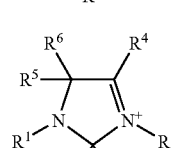

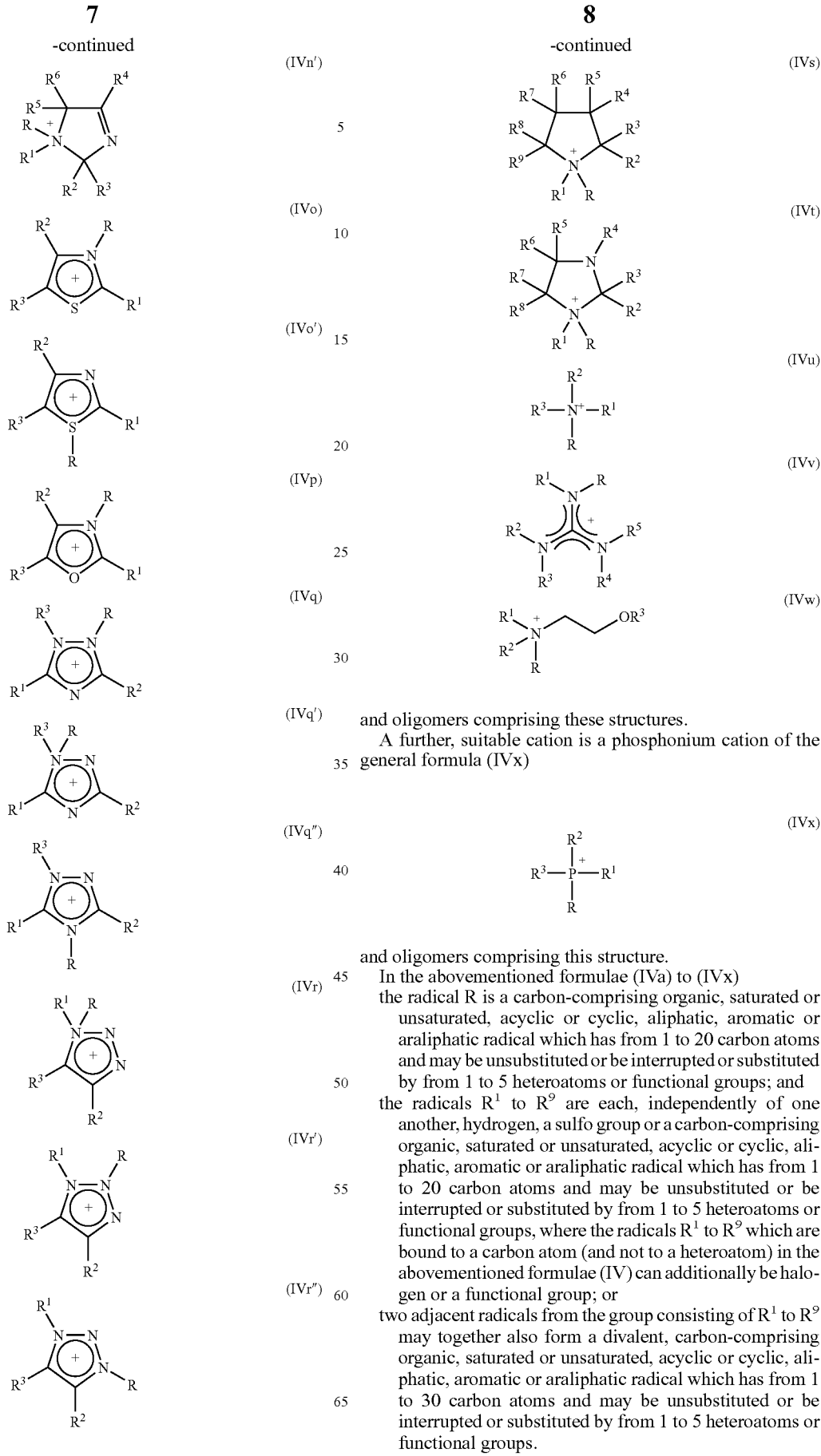

and oligomers comprising these structures.

A further, suitable cation is a phosphonium cation of the general formula (IVx)

and oligomers comprising this structure.

In the abovementioned formulae (IVa) to (IVx)

the radical R is a carbon-comprising organic, saturated or unsaturated, acyclic or cyclic, aliphatic, aromatic or araliphatic radical which has from 1 to 20 carbon atoms and may be unsubstituted or be interrupted or substituted by from 1 to 5 heteroatoms or functional groups; and the radicals $R^1$ to $R^9$ are each, independently of one another, hydrogen, a sulfo group or a carbon-comprising organic, saturated or unsaturated, acyclic or cyclic, aliphatic, aromatic or araliphatic radical which has from 1 to 20 carbon atoms and may be unsubstituted or be interrupted or substituted by from 1 to 5 heteroatoms or functional groups, where the radicals $R^1$ to $R^9$ which are bound to a carbon atom (and not to a heteroatom) in the abovementioned formulae (IV) can additionally be halogen or a functional group; or two adjacent radicals from the group consisting of $R^1$ to $R^9$ may together also form a divalent, carbon-comprising organic, saturated or unsaturated, acyclic or cyclic, aliphatic, aromatic or araliphatic radical which has from 1 to 30 carbon atoms and may be unsubstituted or be interrupted or substituted by from 1 to 5 heteroatoms or functional groups.

In the definitions of the radicals R and $R^1$ to $R^9$, possible heteroatoms are in principle all heteroatoms which are able to formally replace a —$CH_2$—, group, a —CH= group, a —C≡ group or a =C= group. If the carbon-comprising radical comprises heteroatoms, then oxygen, nitrogen, sulfur, phosphorus and silicon are preferred. Preferred groups are, in particular, —O—, —S—, —SO—, —$SO_2$—, —NR'—, —N=, —PR'—, —POR'— and —$SiR'_2$—, where the radicals R' are the remaining part of the carbon-comprising radical. In the cases in which the radicals $R^1$ to $R^9$ are bound to a carbon atom (and not a heteroatom) in the abovementioned formulae (IV), they can also be bound directly via the heteroatom.

Suitable functional groups are in principle all functional groups which can be bound to a carbon atom or a heteroatom. Suitable examples are —OH (hydroxy), =O (in particular as carbonyl group), —$NH_2$ (amino), =NH (imino), —COOH (carboxy), —$CONH_2$ (carboxamide), —$SO_3H$ (sulfo) and —CN (cyano). Functional groups and heteroatoms can also be directly adjacent, so that combinations of a plurality of adjacent atoms, for instance —O— (ether), —S-(thioether), —COO— (ester), —CONH— (secondary amide) or —CONR'— (tertiary amide), are also comprised, for example di-($C_1$-$C_4$-alkyl)amino, $C_1$-$C_4$-alkyloxycarbonyl or $C_1$-$C_4$-alkyloxy.

As halogens, mention may be made of fluorine, chlorine, bromine and iodine.

The radical R is preferably
  unbranched or branched $C_1$-$C_{18}$-alkyl which may be unsubstituted or substituted by one or more hydroxy, halogen, phenyl, cyano, $C_1$-$C_6$-alkoxycarbonyl and/or sulfonic acid groups and has a total of from 1 to 20 carbon atoms, for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexadecyl, 1-octadecyl, 2-hydroxyethyl, benzyl, 3-phenylpropyl, 2-cyanoethyl, 2-(methoxycarbonyl) ethyl, 2-(ethoxycarbonyl)ethyl, 2-(n-butoxycarbonyl) ethyl, trifluoromethyl, difluoromethyl, fluoromethyl, pentafluoroethyl, heptafluoropropyl, heptafluoroisopropyl, nonafluorobutyl, nonafluoroisobutyl, undecylfluoropentyl, undecylfluorisopentyl, 6-hydroxyhexyl and propylsulfonic acid;
  glycols, butylene glycols and oligomers thereof having from 1 to 100 units and a hydrogen or a $C_1$-$C_8$-alkyl as end group, for example $R^A$O—(CHR$^B$—$CH_2$—O)$_p$—CHR$^B$—$CH_2$— or $R^A$O—($CH_2CH_2CH_2CH_2$O)$_p$—$CH_2CH_2CH_2CH_2$O— where $R^A$ and $R^B$ are each preferably hydrogen, methyl or ethyl and p is preferably 0, 1, 2 or 3, in particular 3-oxabutyl, 3-oxapentyl, 3,6-dioxaheptyl, 3,6-dioxaoctyl, 3,6,9-trioxadecyl, 3,6,9-trioxaundecyl, 3,6,9,12-tetraoxamidecyl and 3,6,9,12-tetraoxatetradecyl;
  vinyl; and
  N,N-di-$C_1$-$C_6$-alkylamino such as N,N-dimethylamino and N,N-diethylamino.

The radical R is particularly preferably unbranched and unsubstituted $C_1$-$C_{18}$-alkyl, such as methyl, ethyl, 1-propyl, 1-butyl, 1-pentyl, 1-hexyl, 1-heptyl, 1-octyl, 1-decyl, 1-dodecyl, 1-tetradecyl, 1-hexadecyl, 1-octadecyl, in particular methyl, ethyl, 1-butyl and 1-octyl, or $CH_3O$—($CH_2CH_2O$)$_p$—$CH_2CH_2$— and $CH_3CH_2O$—($CH_2CH_2O$)$_p$—$CH_2CH_2$— where p is 0, 1, 2 or 3.

Preference is given to the radicals $R^1$ to $R^9$ each being, independently of one another,
  hydrogen;
  halogen;
  a functional group;
  $C_1$-$C_{18}$-alkyl which may optionally be substituted by functional groups, aryl, alkyl, aryloxy, alkyloxy, halogen, heteroatoms and/or heterocycles and/or be interrupted by one or more oxygen and/or sulfur atoms and/or one or more substituted or unsubstituted imino groups;
  $C_2$-$C_{18}$-alkenyl, which may optionally be substituted by functional groups, aryl, alkyl, aryloxy, alkyloxy, halogen, heteroatoms and/or heterocycles and/or be interrupted by one or more oxygen and/or sulfur atoms and/or one or more substituted or unsubstituted imino groups;
  $C_6$-$C_{12}$-aryl which may optionally be substituted by functional groups, aryl, alkyl, aryloxy, alkyloxy, halogen, heteroatoms and/or heterocycles;
  $C_5$-$C_{12}$-cycloalkyl which may optionally be substituted by functional groups, aryl, alkyl, aryloxy, alkyloxy, halogen, heteroatoms and/or heterocycles;
  $C_5$-$C_{12}$-cycloalkenyl which may optionally be substituted by functional groups, aryl, alkyl, aryloxy, alkyloxy, halogen, heteroatoms and/or heterocycles; or
  a five- or six-membered, oxygen-, nitrogen- and/or sulfur-comprising heterocycle which may optionally be substituted by functional groups, aryl, alkyl, aryloxy, alkyloxy, halogen, heteroatoms and/or heterocycles; or
two adjacent radicals together forming
  an unsaturated, saturated or aromatic ring which may optionally be substituted by functional groups, aryl, alkyl, aryloxy, alkyloxy, halogen, heteroatoms and/or heterocycles and may optionally be interrupted by one or more oxygen and/or sulfur atoms and/or one or more substituted or unsubstituted imino groups.

$C_1$-$C_{18}$-alkyl which may optionally be substituted by functional groups, aryl, alkyl, aryloxy, alkyloxy, halogen, heteroatoms and/or heterocycles is preferably methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, 2-ethylhexyl, 2,4,4-trimethylpentyl, 1,1,3,3-tetramethylbutyl, 1-nonyl, 1-decyl, 1-undecyl, 1-dodecyl, 1-tridecyl, 1-tetradecyl, 1-pentadecyl, 1-hexadecyl, 1-heptadecyl, 1-octadecyl, cyclopentylmethyl, 2-cyclopentylethyl, 3-cyclopentylpropyl, cyclohexylmethyl, 2-cyclohexylethyl, 3-cyclohexylpropyl, benzyl (phenylmethyl), diphenylmethyl (benzhydryl), triphenylmethyl, 1-phenylethyl, 2-phenylethyl, 3-phenylpropyl, α,α-dimethylbenzyl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di-(methoxycarbonyl)ethyl, methoxy, ethoxy, formyl, 1,3-dioxolan-2-yl, 1,3-dioxan-2-yl, 2-methyl-1,3-dioxolan-2-yl, 4-methyl-1,3-dioxolan-2-yl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl, 6-ethoxyhexyl, acetyl, $C_qF_{2(q-a)+(1-b)}H_{2a+b}$ where q is from 1 to 30, $0 \leq a \leq q$ and b=0 or 1 (for example $CF_3$, $C_2F_5$, $CH_2CH_2-C_{(q-2)}F_{2(q-2)+1}$, $C_6F_{13}$, $C_8F_{17}$, $C_{10}F_{21}$, $C_{12}F_{25}$), chloromethyl, 2-chloroethyl, trichloromethyl, 1,1-dimethyl-2-chloroethyl, methoxymethyl, 2-butoxyethyl, diethoxymethyl, diethoxyethyl, 2-isopropoxyethyl, 2-butoxypropyl, 2-octyloxyethyl, 2-methoxyisopropyl, 2-(methoxycarbonyl)ethyl, 2-(ethoxycarbonyl)ethyl, 2-(n-butoxycarbonyl)ethyl, butylthiomethyl, 2-dodecylthioethyl, 2-phenylthioethyl, 5-hydroxy-3-oxapentyl, 8-hydroxy-3,6-dioxaoctyl, 11-hydroxy-3,6,9-trioxaundecyl, 7-hydroxy-4-oxaheptyl, 11-hydroxy-4,8-dioxaundecyl, 15-hydroxy-4,8,12-trioxapentadecyl, 9-hydroxy-5-oxanonyl, 14-Hydroxy-5,10-dioxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-dioxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

$C_2$-$C_{18}$-alkenyl which may optionally be substituted by functional groups, aryl, alkyl, aryloxy, alkyloxy, halogen, heteroatoms and/or heterocycles and/or be interrupted by one or more oxygen and/or sulfur atoms and/or one or more substituted or unsubstituted imino groups is preferably vinyl, 2-propenyl, 3-butenyl, cis-2-butenyl, trans-2-butenyl or $C_qF_{2(q-a)-(1-b)}H_{2a-b}$ where $q \leq 30$, $0 \leq a \leq q$ and b=0 or 1.

$C_6$-$C_{12}$-aryl which may optionally be substituted by functional groups, aryl, alkyl, aryloxy, alkyloxy, halogen, heteroatoms and/or heterocycles is preferably phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, iso-propylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2-nitrophenyl, 4-nitrophenyl, 2,4-dinitrophenyl, 2,6-dinitrophenyl, 4-dimethylaminophenyl, 4-acetylphenyl, methoxyethylphenyl, ethoxymethylphenyl, methylthiophenyl, isopropylthiophenyl or tert-butylthiophenyl or $C_6F_{(5-a)}H_a$ where $0 \leq a \leq 5$.

$C_5$-$C_{12}$-cycloalkyl which may optionally be substituted by functional groups, aryl, alkyl, aryloxy, alkyloxy, halogen, heteroatoms and/or heterocycles is preferably cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl, $C_qF_{2(q-a)-(1-b)}H_{2a-b}$ where $q \leq 30$, $0 \leq a \leq q$ and b=0 or 1, or a saturated or unsaturated bicyclic system such as norbornyl or norbornenyl.

$C_5$- to $C_{12}$-cycloalkenyl which may optionally be substituted by functional groups, aryl, alkyl, aryloxy, alkyloxy, halogen, heteroatoms and/or heterocycles is preferably 3-cyclopentenyl, 2-cyclohexenyl, 3-cyclohexenyl, 2,5-cyclohexadienyl or $C_qF_{2(q-a)-3(1-b)}H_{2a-3b}$ where $q \leq 30$, $0 \leq a \leq q$ and b=0 or 1.

A five- or six-membered, oxygen-, nitrogen- and/or sulfur-comprising heterocycle which may optionally be substituted by functional groups, aryl, alkyl, aryloxy, alkyloxy, halogen, heteroatoms and/or heterocycles is preferably furyl, thiophenyl, pyrryl, pyridyl, indolyl, benzoxazolyl, dioxolyl, dioxyl, benzimidazolyl, benzthiazolyl, dimethylpyridyl, methylquinolyl, dimethylpyrryl, methoxyfuryl, dimethoxypyridyl or difluoropyridyl.

If two adjacent radicals together form an unsaturated, saturated or aromatic ring which may optionally be substituted by functional groups, aryl, alkyl, aryloxy, alkyloxy, halogen, heteroatoms and/or heterocycles and may optionally be interrupted by one or more oxygen and/or sulfur atoms and/or one or more substituted or unsubstituted imino groups, they preferably form 1,3-propylene, 1,4-butylene, 1,5-pentylene, 2-oxa-1,3-propylene, 1-oxa-1,3-propylene, 2-oxa-1,3-propylene, 1-oxa-1,3-propenylene, 3-oxa-1,5-pentylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

If the abovementioned radicals comprise oxygen and/or sulfur atoms and/or substituted or unsubstituted imino groups, the number of oxygen and/or sulfur atoms and/or imino groups is not subject to any restrictions. In general, there will be no more than 5 in the radical, preferably no more than 4 and very particularly preferably no more than 3.

If the abovementioned radicals comprise heteroatoms, there is generally at least one carbon atom, preferably at least two carbon atoms, between any two heteroatoms.

Particular preference is given to the radicals $R^1$ to $R^9$ each being, independently of one another, hydrogen;

unbranched or branched $C_1$-$C_{18}$-alkyl which may be unsubstituted or substituted by one or more hydroxy, halogen, phenyl, cyano, $C_1$-$C_6$-alkylcarbonyl and/or sulfonic acid groups and has a total of from 1 to 20 carbon atoms, for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexadecyl, 1-octadecyl, 2-hydroxyethyl, benzyl, 3-phenylpropyl, 2-cyanoethyl, 2-(methoxycarbonyl)ethyl, 2-(ethoxycarbonyl)ethyl, 2-(n-butoxy-carbonyl)ethyl, trifluoromethyl, difluoromethyl, fluoromethyl, pentafluoroethyl, heptafluoropropyl, heptafluoroisopropyl, nonafluorobutyl, nonafluoroisobutyl, undecylfluoropentyl, undecylfluoroisopentyl, 6-hydroxyhexyl and propylsulfonic acid;

glycols, butylene glycols and oligomers thereof having from 1 to 100 units and a hydrogen or a $C_1$-$C_8$-alkyl as end group, for example $R^AO-(CHR^B-CH_2-O)_p-CHR^B-CH_2-$ or $R^AO-(CH_2CH_2CH_2CH_2O)_p-CH_2CH_2CH_2CH_2O-$ where $R^A$ and $R^B$ are each preferably hydrogen, methyl or ethyl and p is preferably 0, 1, 2 or 3, in particular 3-oxabutyl, 3-oxapentyl, 3,6-dioxaheptyl, 3,6-dioxaoctyl, 3,6,9-trioxadecyl, 3,6,9-trioxaundecyl, 3,6,9,12-tetraoxamidecyl and 3,6,9,12-tetraoxatetradecyl;
vinyl; and
N,N—di—$C_1$-$C_6$-alkylamino, such as N,N-dimethylamino and N,N-diethylamino.

Very particular preference is given to the radicals $R^1$ to $R^9$ each being, independently of one another, hydrogen or $C_1$-$C_{18}$-alkyl such as methyl, ethyl, 1-butyl, 1-pentyl, 1-hexyl, 1-heptyl, 1-octyl, phenyl, 2-hydroxyethyl, 2-cyanoethyl, 2-(methoxycarbonyl)ethyl, 2-(ethoxycarbonyl)ethyl, 2-(n-butoxycarbonyl)ethyl, N,N-dimethylamino, N,N-diethylamino, chlorine or $CH_3O$—$(CH_2CH_2O)_p$—$CH_2CH_2$— and $CH_3CH_2O$—$(CH_2CH_2O)_p$—$CH_2CH_2$— where p is 0, 1, 2 or 3.

Very particular preference is given to ionic liquids in which the cation $[A]^+$ is a pyridinium ion (IVa) in which
  one of the radicals $R^1$ to $R^5$ is methyl, ethyl or chlorine and the remaining radicals $R^1$ to $R^5$ are each hydrogen;
  $R^3$ is dimethylamino and the remaining radicals $R^1$, $R^2$, $R^4$ and $R^5$ are each hydrogen;
  all radicals $R^1$ to $R^5$ are hydrogen;
  $R^2$ is carboxy or carboxamide and the remaining radicals $R^1$, $R^2$, $R^4$ and $R^5$ are each hydrogen; or
  $R^1$ and $R^2$ or $R^2$ and $R^3$ are together 1,4-buta-1,3-dienylene and the remaining radicals $R^1$, $R^2$, $R^4$ and $R^5$ are each hydrogen;
and in particular one in which
  $R^1$ to $R^5$ are each hydrogen; or
  one of the radicals $R^1$ to $R^5$ is methyl or ethyl and the remaining radicals $R^1$ to $R^5$ are each hydrogen.

As very particularly preferred pyridinium ions (IVa), mention may be made of 1-methylpyridinium, 1-ethylpyridinium, 1-(1-butyl)pyridinium, 1-(1-hexyl)pyridinium, 1-(1-octyl)pyridinium, 1-(1-hexyl)pyridinium, 1-(1-octyl)pyridinium, 1-(1-dodecyl)pyridinium, 1-(1-tetradecyl)pyridinium, 1-(1-hexadecyl)pyridinium, 1,2-dimethylpyridinium, 1-ethyl-2-methylpyridinium, 1-(1-butyl)-2-methylpyridinium, 1-(1-hexyl)-2-methylpyridinium, 1-(1-octyl)-2-methylpyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-diethylpyridinium, 1-(1-butyl)-2-ethylpyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethylpyridinium, 1-(1-hexadecyl)-2-ethylpyridinium, 1,2-dimethyl-5-ethylpyridinium, 1,5-diethyl-2-methylpyridinium, 1-(1-butyl)-2-methyl-3-ethylpyridinium, 1-(1-hexyl)-2-methyl-3-ethylpyridinium and 1-(1-octyl)-2-methyl-3-ethyl-pyridinium, 1-(1-dodecyl)-2-methyl-3-ethylpyridinium, 1-(1-tetradecyl)-2-methyl-3-ethylpyridinium and 1-(1-hexadecyl)-2-methyl-3-ethylpyridinium.

Very particular preference is given to ionic liquids in which the cation $[A]^+$ is a pyridazinium ion (IVb) in which
  $R^1$ to $R^4$ are each hydrogen; or
  one of the radicals $R^1$ to $R^4$ is methyl or ethyl and the remaining radicals $R^1$ to $R^4$ are each hydrogen.

Very particular preference is given to ionic liquids in which the cation $[A]^+$ is a pyrimidinium ion (IVc) in which
  $R^1$ is hydrogen, methyl or ethyl and $R^2$ to $R^4$ are each, independently of one another, hydrogen or methyl; or
  $R^1$ is hydrogen, methyl or ethyl, $R^2$ and $R^4$ are each methyl and $R^3$ is hydrogen.

Very particular preference is given to ionic liquids in which the cation $[A]^+$ is a pyrazinium ion (IVd) in which $R^1$ is hydrogen, methyl or ethyl and $R^2$ to $R^4$ are each, independently of one another, hydrogen or methyl;
$R^1$ is hydrogen, methyl or ethyl, $R^2$ and $R^4$ are each methyl and $R^3$ is hydrogen;
$R^1$ to $R^4$ are each methyl; or
$R^1$ to $R^4$ are each methyl or hydrogen.

Very particular preference is given to ionic liquids in which the cation $[A]^+$ is an imidazolium ion (IVe) in which
  $R^1$ is hydrogen, methyl, ethyl, 1-propyl, 1-butyl, 1-pentyl, 1-hexyl, 1-octyl, 2-hydroxyethyl or 2-cyanoethyl and $R^2$ to $R^4$ are each, independently of one another, hydrogen, methyl or ethyl.

As very particularly preferred imidazolium ions (IVe), mention may be made of 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methyl-imidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium, 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium and 1,4,5-trimethyl-3-octylimidazolium.

Very particular preference is given to ionic liquids in which the cation $[A]^+$ is a pyrazolium ion (IVf), (IVg) or (IVg') in which
  $R^1$ is hydrogen, methyl or ethyl and $R^2$ to $R^4$ are each, independently of one another, hydrogen or methyl.

Very particular preference is given to ionic liquids in which the cation $[A]^+$ is a pyrazolium ion (IVh) in which
  $R^1$ to $R^4$ are each, independently of one another, hydrogen or methyl.

Very particular preference is given to ionic liquids in which the cation $[A]^+$ is a 1-pyrazolinium ion (IVi) in which
  $R^1$ to $R^6$ are each, independently of one another, hydrogen or methyl.

Very particular preference is given to ionic liquids in which the cation $[A]^+$ is a 2-pyrazolinium ion (IVj') in which
  $R^1$ is hydrogen, methyl, ethyl or phenyl and $R^2$ to $R^6$ are each, independently of one another, hydrogen or methyl.

Very particular preference is given to ionic liquids in which the cation $[A]^+$ is a 3-pyrazolinium ion (IVk) or (IVk') in which
  $R^1$ and $R^2$ are each, independently of one another, hydrogen, methyl, ethyl or phenyl and $R^3$ to $R^6$ are each, independently of one another, hydrogen or methyl.

Very particular preference is given to ionic liquids in which the cation $[A]^+$ is an imidazolinium ion (Ivl) in which
  $R^1$ to $R^2$ are each, independently of one another, hydrogen, methyl, ethyl, 1-butyl or phenyl, $R^3$ and $R^4$ are each, independently of one another, hydrogen, methyl or ethyl and $R^5$ and $R^6$ are each, independently of one another, hydrogen or methyl.

Very particular preference is given to ionic liquids in which the cation $[A]^+$ is an imidazolinium ion (IVm) or (IVm') in which
$R^1$ and $R^2$ are each, independently of one another, hydrogen, methyl or ethyl and $R^3$ to $R^6$ are each, independently of one another, hydrogen or methyl.

Very particular preference is given to ionic liquids in which the cation $[A]^+$ is an imidazolinium ion (IVn) or (IVn') in which
$R^1$ to $R^3$ are each, independently of one another, hydrogen, methyl or ethyl and $R^4$ to $R^6$ are each, independently of one another, hydrogen or methyl.

Very particular preference is given to ionic liquids in which the cation $[A]^+$ is a thiazolium ion (IVo) or (IVo') or oxazolium ion (IVp) in which
$R^1$ is hydrogen, methyl, ethyl or phenyl and $R^2$ and $R^3$ are each, independently of one another, hydrogen or methyl.

Very particular preference is given to ionic liquids in which the cation $[A]^+$ is a 1,2,4-triazolium ion (IVq), (IVq') or (IVq'') in which
$R^1$ and $R^2$ are each, independently of one another, hydrogen, methyl, ethyl or phenyl and $R^3$ is hydrogen, methyl or phenyl.

Very particular preference is given to ionic liquids in which the cation $[A]^+$ is a 1,2,3-triazolium ion (IVr), (IVr') or (IVr'') in which
$R^1$ is hydrogen, methyl or ethyl and $R^2$ and $R^3$ are each, independently of one another, hydrogen or methyl, or $R^2$ and $R^3$ are together 1,4-buta-1,3-dienylene.

Very particular preference is given to ionic liquids in which the cation $[A]^+$ is a pyrrolidinium ion (IVs) in which
$R^1$ is hydrogen, methyl, ethyl or phenyl and $R^2$ to $R^9$ are each, independently of one another, hydrogen or methyl.

Very particular preference is given to ionic liquids in which the cation $[A]^+$ is an imidazolidinium ion (IVt) in which
$R^1$ and $R^4$ are each, independently of one another, hydrogen, methyl, ethyl or phenyl and $R^2$ and $R^3$ and also $R^5$ to $R^8$ are each, independently of one another, hydrogen or methyl.

Very particular preference is given to ionic liquids in which the cation $[A]^+$ is an ammonium ion (IVu) in which
$R^1$ to $R^3$ are each, independently of one another, $C_1$-$C_{18}$-alkyl; or
$R^1$ to $R^3$ are each, independently of one another, hydrogen or $C_1$-$C_{18}$-alkyl and $R^4$ is 2-hydroxyethyl; or
$R^1$ and $R^2$ are together 1,5-pentylene or 3-oxa-1,5-pentylene and $R^3$ is $C_1$-$C_{18}$-alkyl, 2-hydroxyethyl or 2-cyanoethyl.

Very particularly preferred ammonium ions (IVu) are methyltri(1-butyl)ammonium, 2-hydroxyethylammonium, N,N-dimethylpiperidinium and N,N-dimethylmorpholinium.

Very particular preference is given to ionic liquids in which the cation $[A]^+$ is a guanidinium ion (IVv) in which
$R^1$ to $R^5$ are each methyl.

A very particularly preferred guanidinium ion (IVv) is N,N,N',N',N'',N''-hexamethyl-guanidinium.

Very particular preference is given to ionic liquids in which the cation $[A]^+$ is a cholinium ion (IVw) in which
$R^1$ and $R^2$ are each, independently of one another, methyl, ethyl, 1-butyl or 1-octyl and $R^3$ is hydrogen, methyl, ethyl, acetyl, —$SO_2OH$ or —$PO(OH)_2$;
$R^1$ is methyl, ethyl, 1-butyl or 1-octyl, $R^2$ is a —$CH_2$—$CH_2$—$OR^4$ group and $R^3$ and $R^4$ are each, independently of one another, hydrogen, methyl, ethyl, acetyl, —$SO_2OH$ or —$PO(OH)_2$; or
$R^1$ is a —$CH_2$—$CH_2$—$OR^4$ group, $R^2$ is a —$CH_2$—$CH_2$—$OR^5$ group and $R^3$ to $R^5$ are each, independently of one another, hydrogen, methyl, ethyl, acetyl, —$SO_2OH$ or —$PO(OH)_2$.

Very particular preference is given to ionic liquids in which the cation $[A]^+$ is a phosphonium ion (IVx) in which
$R^1$ to $R^3$ are each, independently of one another, $C_1$-$C_{18}$-alkyl, in particular butyl, isobutyl, 1-hexyl or 1-octyl.

Among the abovementioned cations, preference is given to the pyridinium ions (IVa), imidazolium ions (IVe) and ammonium ions (IVu), in particular 1-methylpyridinium, 1-ethylpyridinium, 1-(1-butyl)pyridinium, 1-(1-hexyl)pyridinium, 1-(1-octyl)pyridinium, 1-(1-hexyl)pyridinium, 1-(1-octyl)pyridinium, 1-(1-dodecyl)pyridinium, 1-(1-tetradecyl)pyridinium, 1-(1-hexadecyl)pyridinium, 1,2-dimethylpyridinium, 1-ethyl-2-methylpyridinium, 1-(1-butyl)-2-methylpyridinium, 1-(1-hexyl)-2-methylpyridinium, 1-(1-octyl)-2-methylpyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-diethylpyridinium, 1-(1-butyl)-2-ethylpyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethylpyridinium, 1-(1-hexadecyl)-2-ethylpyridinium, 1,2-dimethyl-5-ethylpyridinium, 1,5-diethyl-2-methylpyridinium, 1-(1-butyl)-2-methyl-3-ethylpyridinium, 1-(1-hexyl)-2-methyl-3-ethylpyridinium, 1-(1-octyl)-2-methyl-3-ethylpyridinium, 1-(1-dodecyl)-2-methyl-3-ethylpyridinium, 1-(1-tetradecyl)-2-methyl-3-ethylpyridinium, 1-(1-hexadecyl)-2-methyl-3-ethylpyridinium, 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazoiium, 1-(1-hexyl)-3-methylimidazolium, 1-(1-octyl)-3-methylimidazolium, 1-(1-dodecyl)-3-methylimidazolium, 1-(1-tetradecyl)-3-methylimidazolium, 1-(1-hexadecyl)-3-methylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium and 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium and 1,4,5-trimethyl-3-octylimidazolium and 2-hydroxyethylammonium.

The metal cations $[M^1]^+$, $[M^2]^+$, $[M^3]^+$, $[M^4]^{2+}$ and $[M^1]^{3+}$ mentioned in the formulae (IIIa) to (IIIj) are generally metal cations of groups 1, 2, 6, 7, 8, 9, 10, 11, 12 and 13 of the Periodic Table. Suitable metal cations are, for example, $Li^+$, $Na^+$, $K^+$, $Cs^+$, $Mg^{2+}$, $Ca^{2+}$, $Ba^{2+}$, $Cr^{3+}$, $Fe^{2+}$, $Fe^{3+}$, $Co^{2+}$, $Ni^{2+}$, $Cu^{2+}$, $Ag^+$, $Zn^{2+}$ and $Al^{3+}$.

As anions, it is in principle possible to use all anions which in combination with the cation lead to an ionic liquid.

The anion $[Y]^{n-}$ of the ionic liquid is, for example, selected from among:
the group of halides and halogen-comprising compounds of the formulae:

$F^-$, $Cl^-$, $Br^-$, $I^-$, $BF_4^-$, $PF_6^-$, $AlCl_4^-$, $Al_2Cl_7^-$, $Al_3Cl_{10}^-$, $AlBr_4^-$, $FeCl_4^-$, $BCl_4^-$, $SbF_6^-$, $AsF_6^-$, $ZnCl_3^-$, $SnCl_3^-$, $CuCl_2^-$, $CF_3SO_3^-$, $(CF_3SO_3)_2N^-$, $CF_3CO_2^-$, $CCl_3CO_2^-$, $CN^-$, $SCN^-$, $OCN^-$, $NO^{2-}$, $NO$, $N(CN)^-$;

the group of sulfates, sulfites and sulfonates of the general formulae:

$SO_4^{2-}$, $HSO_4^-$, $SO_3^{2-}$, $HSO_3^-$, $R^aOSO_3^-$, $R^aSO_3^-$;

the group of phosphates of the general formulae:

$PO_4^{3-}$, $HPO_4^{2-}$, $H_2PO_4^-$, $R^aPO_4^{2-}$, $HR^aPO_4^-$, $R^aR^bPO_4^-$;

the group of phosphonates and phosphinates of the general formulae:

$R^aHPO_3^-$, $R^aR^bPO_2^-$, $R^aR^bPO_3^-$;

the group of phosphites of the general formulae:

$PO_3^{3-}$, $HPO_3^{2-}$, $H_2PO_3^-$, $R^aPO_3^{2-}$, $R^aHPO_3^-$, $R^aR^bPO_3^-$;

the group of phosphonites and phosphinites of the general formulae:

$R^aR^bPO_2^-$, $R^aHPO_2^-$, $R^aR^bPO^-$, $R^aHPO^-$;

the group of carboxylates of the general formula:

$R^aCOO^-$;

the group of borates of the general formulae:

$BO_3^{3-}$, $HBO_3^{2-}$, $H_2BO_3^-$, $R^aR^bBO_3^-$, $R^aHBO_3^-$, $R^aBO_3^{2-}$, $B(OR^a)(OR^b)(OR^c)(OR^d)^-$, $B(HSO_4)^-$, $B(R^aSO_4)^-$;

the group of boronates of the general formulae:

$R^aBO_2^{2-}$, $R^aR^bBO^-$;

the group of carbonates and carbonic esters of the general formulae;

$HCO_3^-$, $CO_3^{2-}$, $R^aCO_3^-$;

the group of silicates and silicic esters of the general formulae:

$SiO_4^{4-}$, $HSiO_4^{3-}$, $H_2SiO_4^{2-}$, $H_3SiO_4^-$, $R^aSiO_4^{3-}$, $R^aR^bSiO_4^{2-}$, $R^aR^bR^cSiO_4^-$, $HR^aSiO_4^{2-}$, $H_2R^aSiO_4^-$, $HR^aR^bSiO_4^-$;

the group of alkylsilane and arylsilane salts of the general formulae:

$R^aSiO_3^{3-}$, $R^aR^bSO_2^{2-}$, $R^aR^bR^cSiO^-$, $R^aR^bR^cSiO_3^-$, $R^aR^bR^cSiO_2$, $R^aR^bSiO_3^{2-}$;

the group of carboximides, bis(sulfonyl)imides and sulfonylimides of the general formulae:

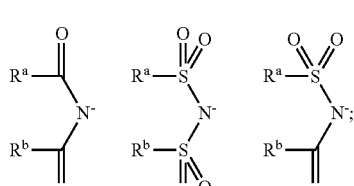

the group of methides of the general formula:

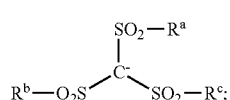

the group of alkoxides and aryloxides of the general formula:

$R^aO^-$;

the group of halometalates of the general formula $[M_rHal_t]^{s-}$, where M is a metal and Hal is fluorine, chlorine, bromine or iodine, r and t are positive integers and indicate the stoichiometry of the complex and s is a positive integer and indicates the charge on the complex;

the group of sulfides, hydrosulfides, polysulfides, hydropolysulfides and thiolates of the general formulae:

$S^{2-}$, $HS^-$, $[S_v]^{2-}$, $[HS_v]^-$, $[R^aS]^-$, where v is a positive integer from 2 to 10;

the group of complex metal ions such as $Fe(CN)_6^{3-}$, $Fe(CN)_6^{4-}$, $MnO_4^-$, $Fe(CO)_4^-$.

Here, $R^a$, $R^b$, $R^c$ and $R^d$ are each, independently of one another, hydrogen;

$C_1$-$C_{30}$-alkyl or an aryl-, heteroaryl-, cycloalkyl-, halogen-, hydroxy-, amino-, carboxy-, formyl-, —O—, —CO—, —CO—O— or —CO—N<-substituted derivative thereof, for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, triacontyl, phenylmethyl (benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, 3-cyclohexylpropyl, methoxy, ethoxy, formyl, acetyl or $C_qF_{2(q-a)+(1-b)}H_{2a+b}$ where q≤30, 0≤a≤q and b=0 or 1 (for example $CF_3$, $C_2F_5$, $CH_2CH_2$—$C_{(q-2)}F_{2(q-2)+1}$, $C_6F_{13}$, $C_8F_{17}$, $C_{10}F_{21}$, $C_{12}F_{25}$);

$C_3$-$C_{12}$-cycloalkyl or an aryl-, heteroaryl-, cycloalkyl-, halogen-, hydroxy-, amino-, carboxy-, formyl-, —O—, —CO— or —CO—O-substituted derivative thereof, for example cyclopentyl, 2-methyl-1-cyclopentyl, 3-methyl-1-cyclopentyl, cyclohexyl, 2-methyl-1-cyclohexyl, 3-methyl-1-cyclohexyl, 4-methyl-1-cyclohexyl or $C_qF_{2(q-a)-(1-b)}H_{2a-b}$ where q≤30, 0≤a≤q and b=0 or 1;

$C_2$-$C_{30}$-alkenyl or an aryl-, heteroaryl-, cycloalkyl-, halogen-, hydroxy-, amino-, carboxy-, formyl-, —O—, —CO— or —CO—O-substituted derivative thereof, for example 2-propenyl, 3-butenyl, cis-2-butenyl, trans-2-butenyl or $C_qF_{2(q-a)-(1-b)}H_{2a-b}$ where q≤30, 0≤a≤q and b=0 or 1;

$C_3$-$C_{12}$-cycloalkenyl or an aryl-, heteroaryl-, cycloalkyl-, halogen-, hydroxy-, amino-, carboxy-, formyl-, —O—, —CO— or —CO—O-substituted derivative thereof, for example 3-cyclopentenyl, 2-cyclohexenyl, 3-cyclohexenyl, 2,5-cyclohexadienyl or $C_qF_{2(q-a)-3(1-b)}H_{2a-3b}$ where q≤30, 0≤a≤q and b=0 or 1;

aryl or heteroaryl having from 2 to 30 carbon atoms or an alkyl-, aryl-, heteroaryl-, cycloalkyl-, halogen-, hydroxy-, amino-, carboxy-, formyl-, —O—, —CO— or —CO—O-substituted derivative thereof, for example phenyl, 2-methylphenyl (2-tolyl), 3-methylphenyl (3-tolyl), 4-methylphenyl, 2-ethylphenyl, 3-ethylphenyl, 4-ethylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 4-phenylphenyl, 1-naphthyl, 2-naphthyl, 1-pyrrolyl, 2-pyrrolyl, 3-pyrrolyl, 2-pyridinyl, 3-pyridinyl, 4-pyridinyl or $C_6F^{(5-a)}H_a$ where $0 \leq a \leq 5$; or two radicals together forming an unsaturated, saturated or aromatic ring which may optionally be substituted by functional groups, aryl, alkyl, aryloxy, alkyloxy, halogen, heteroatoms and/or heterocycles and optionally be interrupted by one or more oxygen and/or sulfur atoms and/or one or more substituted or unsubstituted imino groups.

Very particularly preferred anions are chloride; bromide; iodide; thiocyanate; hexafluorophosphate; trifluoromethanesulfonate; methanesulfonate; formate; acetate; mandelate; nitrate; nitrite; trifluoroacetate; sulfate; hydrosulfate; methylsulfate; ethylsulfate; 1-propylsulfate; 1-butylsulfate; 1-hexylsulfate; 1-octylsulfate; phosphate; dihydrophosphate; hydrophosphate; $C_1$-$C_4$-dialkylphosphate; propionate; tetrachloroaluminate; $Al_2Cl_7^-$; chlorozincate; chloroferrate; bis(trifluoromethylsulfonyl)imide; bis(pentafluoroethylsulfonyl)imide; bis(methylsulfonyl)imide; bis(p-tolylsulfonyl)imide; tris(trifluoromethylsulfonyl)methide; bis(pentafluoroethylsulfonyl)methide; p-tolylsulfonate; tetracarbonylcobaltate; dimethylene glycol monomethyl ether sulfate; oleate; stearate; acrylate; methacrylate; maleate; hydrocitrate; vinylphosphonate; bis(pentafluoroethyl)phosphinate; borates such as bis[salicylato(2-)]borate, bis[oxalato(2-)]borate, bis[1,2-benzenediolato(2-)-O,O']borate, tetracyanoborate, tetrafluoroborate; dicyanamide; tris(pentafluoroethyl)trifluorophosphate; tris(heptafluoropropyl)trifluorophosphate, cyclic arylphosphates such as catecholphosphate $(C_6H_4O_2)P(O)O^-$ and chlorocobaltate.

Very particularly preferred anions are chloride, bromide, hydrosulfate, tetrachloroaluminate, thiocyanate, methylsulfate, ethylsulfate, methanesulfonate, formate, acetate, dimethylphosphate, diethylphosphate, p-tolylsulfonate, tetrafluoroborate and hexafluorophosphate.

Especial preference is given to ionic liquids which comprise
methyltri-(1-butyl)ammonium, 2-hydroxyethylammonium, 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium, 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium or 1,4,5-trimethyl-3-octylimidazolium
as cation and
chloride, bromide, hydrosulfate, tetrachloroaluminate, thiocyanate, methylsulfate, ethylsulfate, methanesulfonate, formate, acetate, dimethylphosphate, diethylphosphate, p-tolylsulfonate, tetrafluoroborate or hexafluorophosphate as anion.

Furthermore, especial preference is given to the following ionic liquids:
1,3-dimethylimidazolium methylsulfate, 1,3-dimethylimidazolium hydrosulfate, 1,3-dimethylimidazolium dimethylphosphate, 1-ethyl-3-methylimidazolium methylsulfate, 1-ethyl-3-methylimidazolium hydrosulfate, 1-ethyl-3-methylimidazolium thiocyanate, 1-ethyl-3-methylimidazolium acetate, 1-ethyl-3-methylimidazolium methanesulfonate, 1-ethyl-3-methylimidazolium diethylphosphate, 1-(1-butyl)-3-methylimidazolium methylsulfate, 1-(1-butyl)-3-methylimidazolium hydrosulfate, 1-(1-butyl)-3-methylimidazolium thiocyanate, 1-(1-butyl)-3-methylimidazolium acetate, 1-(1-butyl)-3-methylimidazolium methanesulfonate, 1-(1-dodecyl)-3-methylimidazolium methylsulfate, 1-(1-dodecyl)-3-methylimidazolium hydrosulfate, 1-(1-tetradecyl)-3-methylimidazolium methylsulfate, 1-(1-tetradecyl)-3-methylimidazolium hydrosulfate, 1-(1-hexadecyl)-3-methylimidazolium methylsulfate or 1-(1-hexadecyl)-3-methylimidazolium hydrosulfate or 2-hydroxyethylammonium formate.

Preference is also given to ionic liquids $[A]_n^+[Y]^{n-}$ where n=1 or 2 and corresponding salts derived from the dimer of $[A]_n^+$ where n=1 or 2, with the cation $[A]^+$ being selected from among the cations of the general formulae (IVa), (IVe), (IVf), (IVg), (IVg'), (IVh), (IVm) in which $NR^1$ is replaced by oxygen, (IVq), (IVq''), (IVr'), (IVv), (IVu), (Ivx), in particular from among

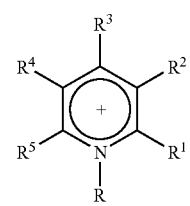

(IVa)

where
R is hydrogen;
linear or branched $C_1$-$C_{20}$-alkyl which may bear one or more groups selected from among halogen, hydroxyl, cyano, amino and mercapto; or
—$(R^x$—$X)_w$—$R^y$ where w=1-10, $R^x$ is linear or branched $C_1$-$C_{20}$-alkyl, $R^y$ is hydrogen or linear or branched $C_1$-$C_{10}$-alkyl and X is an ether, thioether, ester, siloxane or amide group;
$R^1$, $R^2$, $R^3$, $R^4$, $R^5$ are each, independently of one another, hydrogen;
halide, hydroxy,
linear or branched $C_1$-$C_{20}$-alkyl which may bear one or more groups selected from among halogen, hydroxyl, cyano, amino and mercapto;

—$(R^x—X)_w—R^Y$ where w=1-10, $R^x$ is linear or branched $C_1-C_{20}$-alkyl, $R^y$ is hydrogen or linear or branched $C_1-C_{10}$-alkyl and X is an ether, thioether, ester, siloxane or amide group;

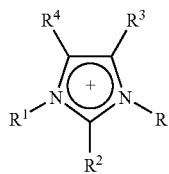

(IVe)

where
R and $R^1$ are each, independently of one another, hydrogen;
  linear or branched $C_1-C_{20}$-alkyl which may bear one or more groups selected from among halogen, hydroxyl, cyano, amino and mercapto;
  or
  —$(R^x—X)_w—R^Y$ where w=1-10, $R^x$ is linear or branched $C_1-C_{20}$-alkyl, $R^y$ is hydrogen or linear or branched $C_1-C_{10}$-alkyl and X is an ether, thioether, ester, siloxane or amide group;
$R^2$, $R^3$ and $R^4$ are each, independently of one another, hydrogen,
  halide, hydroxy,
  linear or branched $C_1-C_{20}$-alkyl which may bear one or more groups selected from among halogen, hydroxyl, cyano, amino and mercapto;
  —$(R^x—X)_w—R^Y$ where w=1-10, $R^x$ is linear or branched $C_1-C_{20}$-alkyl, $R^y$ is hydrogen or linear or branched $C_1-C_{10}$-alkyl and X is an ether, thioether, ester, siloxane or amide group;

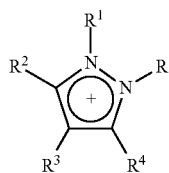

(IVf)

where
R, $R^1$ are each, independently of one another, hydrogen;
  linear or branched $C_1-C_{20}$-alkyl which may bear one or more groups selected from among halogen, hydroxyl, cyano, amino and mercapto; or
  —$(R^x—X)_w—R^Y$ where w=1-10, $R^x$ is linear or branched $C_1-C_{20}$-alkyl, $R^y$ is hydrogen or linear or branched $C_1-C_{10}$-alkyl, and X is an ether, thioether, ester, siloxane or amide group;
$R^2$, $R^3$, $R^4$ are each, independently of one another, hydrogen;
  halide, hydroxy,
  linear or branched $C_1-C_{20}$-alkyl which may bear one or more groups selected from among halogen, hydroxyl, cyano, amino and mercapto;
  —$(R^x—X)_w—R^Y$ where w=1-10, $R^x$ is linear or branched $C_1-C_{20}$-alkyl, $R^y$ is hydrogen or linear or branched $C_1-C_{10}$-alkyl and X is an ether, thioether, ester, siloxane or amide group;

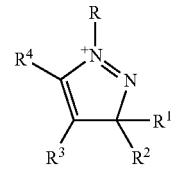

(IVg)

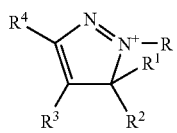

(IVg')

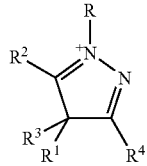

(IVh)

where
R is hydrogen;
  linear or branched $C_1-C_{20}$-alkyl which may bear one or more groups selected from among halogen, hydroxyl, cyano, amino and mercapto;
  or
  —$(R^x—X)_w—R^Y$ where w=1-10, $R^x$ is linear or branched $C_1-C_{20}$-alkyl, $R^y$ is hydrogen or linear or branched $C_1-C_{10}$-alkyl and X is an ether, thioether, ester, siloxane or amide group;
$R^1$, $R^2$, $R^3$, $R^4$ are each, independently of one another, hydrogen;
  halide, hydroxy,
  linear or branched $C_1-C_{20}$-alkyl which may bear one or more groups selected from among halogen, hydroxyl, cyano, amino and mercapto;
  —$(R^x—X)_w—R^Y$ where w=1-10, $R^x$ is linear or branched $C_1-C_{20}$-alkyl, $R^y$ is hydrogen or linear or branched $C_1-C_{10}$-alkyl and X is an ether-, thioether, ester, siloxane or amide group;

(IVm)

where
R is hydrogen;
  linear or branched $C_1-C_{20}$-alkyl which may bear one or more groups selected from among halogen, hydroxyl, cyano, amino and mercapto;
  or
  —$(R^x—X)_w—R^Y$ where w=1-10, $R^x$ is linear or branched $C_1-C_{20}$-alkyl, $R^y$ is hydrogen or linear or branched $C_1-C_{10}$-alkyl and X is an ether, thioether, ester, siloxane or amide group;
$R^2$, $R^3$, $R^4$, $R^5$ and $R^6$ are each, independently of one another, hydrogen;
  halide, hydroxy,
  linear or branched $C_1-C_{20}$-alkyl which may bear one or more groups selected from among halogen, hydroxyl, cyano, amino and mercapto;

—$(R^x-X)_w-R^Y$ where w=1-10, $R^x$ is linear or branched $C_1$-$C_{20}$-alkyl, $R^y$ is hydrogen or linear or branched $C_1$-$C_{10}$-alkyl and X is an ether, thioether, ester, siloxane or amide group;

and N—$R^1$ is replaced by oxygen;

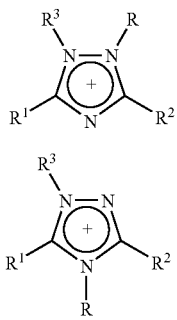
(IVq)

(IVq″)

where

R and $R^3$ are each, independently of one another, hydrogen;
  linear or branched $C_1$-$C_{20}$-alkyl which may bear one or more groups selected from among halogen, hydroxyl, cyano, amino and mercapto; or
  —$(R^x-X)_w-R^Y$ where w=1-10, $R^x$ is linear or branched $C_1$-$C_{20}$-alkyl, $R^y$ is hydrogen or linear or branched $C_1$-$C_{10}$-alkyl and X is an ether, thioether, ester, siloxane or amide group;

$R^1$, $R^2$ are each, independently of one another, hydrogen; halide, hydroxy,
  linear or branched $C_1$-$C_{20}$-alkyl which may bear one or more groups selected from among halogen, hydroxyl, cyano, amino and mercapto;
  —$(R^x-X)_w-R^Y$ where w=1-10, $R^x$ is linear or branched $C_1$-$C_{20}$-alkyl, $R^y$ is hydrogen or linear or branched $C_1$-$C_{10}$-alkyl and X is an ether, thioether, ester, siloxane or amide group;

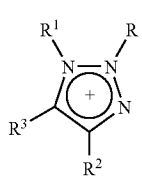
(IVr′)

where

R and $R^1$ are each, independently of one another, hydrogen;
  linear or branched $C_1$-$C_{20}$-alkyl which may bear one or more groups selected from among halogen, hydroxyl, cyano, amino and mercapto;
  or
  —$(R^x-X)_w-R^Y$ where w=1-10, $R^x$ is linear or branched $C_1$-$C_{20}$-alkyl, $R^y$ is hydrogen or linear or branched $C_1$-$C_{10}$-alkyl and X is an ether, thioether, ester, siloxane or amide group;

$R^2$, $R^3$ are each, independently of one another, hydrogen; halide, hydroxy,
  linear or branched $C_1$-$C_{20}$-alkyl which may bear one or more groups selected from among halogen, hydroxyl, cyano, amino and mercapto;
  —$(R^x-X)_w-R^Y$ where w=1-10, $R^x$ is linear or branched $C_1$-$C_{20}$-alkyl, $R^y$ is hydrogen or linear or branched $C_1$-$C_{10}$-alkyl and X is an ether, thioether, ester, siloxane or amide group;

(IVu)

where

R, $R^1$, $R^2$, $R^3$ are each, independently of one another, hydrogen;
  linear or branched $C_1$-$C_{20}$-alkyl which may bear one or more groups selected from among halogen, hydroxyl, cyano, amino and mercapto;
  or
  —$(R^x-X)_w-R^Y$ where w=1-10, $R^x$ is linear or branched $C_1$-$C_{20}$-alkyl, $R^y$ is hydrogen or linear or branched $C_1$-$C_{10}$-alkyl and X is an ether, thioether, ester, siloxane or amide group;

or

R and $R^1$ are each, independently of one another, hydrogen;
  linear or branched $C_1$-$C_{20}$-alkyl which may bear one or more groups selected from among halogen, hydroxyl, cyano, amino and mercapto;
  or
  —$(R^x-X)_w-R^Y$ where w=1-10, $R^x$ is linear or branched $C_1$-$C_{20}$-alkyl, $R^y$ is hydrogen or linear or branched $C_1$-$C_{10}$-alkyl and X is an ether, thioether, ester, siloxane or amide group;

$R^2$ and $R^3$ together form a 3-oxa-1,5-pentylene radical which may in turn be substituted by:
  halogen, hydroxyl;
  linear or branched $C_1$-$C_{20}$-alkyl which may bear one or more groups selected from among halogen, hydroxyl, cyano, amino and mercapto;
  —$(R^x-X)_w-R^Y$ where w=1-10, $R^x$ is linear or branched $C_1$-$C_{20}$-alkyl, $R^y$ is hydrogen or linear or branched $C_1$-$C_{10}$-alkyl and X is an ether, thioether, ester, siloxane or amide group;

or

R and $R^1$ are each, independently of one another, hydrogen;
  linear or branched $C_1$-$C_{20}$-alkyl which may bear one or more groups selected from among halogen, hydroxyl, cyano, amino and mercapto;
  or
  —$(R^x-X)_w-R^Y$ where w=1-10, $R^x$ is linear or branched $C_1$-$C_{20}$-alkyl, $R^y$ is hydrogen or linear or branched $C_1$-$C_{10}$-alkyl and X is an ether, thioether, ester, siloxane or amide group;

$R^2$ and $R^3$ together form a 1,4-buta-1,3-dienylene radical which may in turn be substituted by:
  halogen, hydroxyl;
  linear or branched $C_1$-$C_{20}$-alkyl which may bear one or more groups selected from among halogen, hydroxyl, cyano, amino and mercapto;
  —$(R^x-X)_w-R^Y$ where w=1-10, $R^x$ is linear or branched $C_1$-$C_{20}$-alkyl, $R^y$ is hydrogen or linear or branched $C_1$-$C_{10}$-alkyl and X is an ether, thioether, ester, siloxane or amide group;

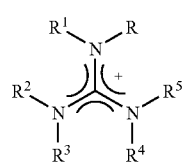
(IVv)

where
R, $R^1$, $R^2$, $R^3$, $R^4$ and $R^5$ are each, independently of one another, hydrogen;
linear or branched $C_1$-$C_{20}$-alkyl which may bear one or more groups selected from among halogen, hydroxyl, cyano, amino and mercapto;
or
—$(R^x$—$X)_w$—$R^Y$ where w=1-10, $R^x$ is linear or branched $C_1$-$C_{20}$-alkyl, $R^y$ is hydrogen or linear or branched $C_1$-$C_{10}$-alkyl and X is an ether, thioether, ester, siloxane or amide group;

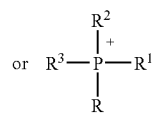
(IVx)

where
R, $R^1$, $R^2$, $R^3$ are each, independently of one another, hydrogen;
linear or branched $C_1$-$C_{20}$-alkyl which may bear one or more groups selected from among halogen, hydroxyl, cyano, amino and mercapto; or
—$(R^x$—$X)_w$—$R^Y$ where w=1-10, $R^x$ is linear or branched $C_1$-$C_{20}$-alkyl, $R^y$ is hydrogen or linear or branched $C_1$-$C_{10}$-alkyl and X is an ether, thioether, ester, siloxane or amide group.

The anions $[Y]^{n-}$ are selected from the group consisting of halide, tetrafluoroborate, sulfate, phosphate, $R^uR^vPO_2$—, dicyanamide, carboxylate $R^u$—$COO^-$, sulfonate $R^u$—$SO_3^-$, benzenesulfonate, toluenesulfonate, organic sulfate $R^u$—O—$SO_3$—, bis(sulfon)imide $[R^u$—$SO_2$—N—$SO_2$—$R^v]^-$, imides of the structure $[R^u$—CO—N—CO—$R^v]^-$ and the structure $[R^u$—$SO_2$—N—CO—$R^v]^-$ and formate, where $R^u$ and $R^v$ are each, independently of one another, linear or branched, aliphatic or alicyclic $C_1$-$C_{20}$-alkyl, $C_5$-$C_{15}$-aryl, $C_5$-$C_{15}$-aryl-$C_1$-$C_6$-alkyl or $C_1$-$C_6$-alkyl-$C_5$-$C_{15}$-aryl, where the abovementioned radicals may be substituted by one or more radicals selected from the group consisting of halogen and hydroxyl.

Particular preference is given to working substance pairings comprising water, methanol or ammonia, in particular water or ammonia, as component A) and an ionic liquid according to one of the above particular embodiments as component B). Extraordinary preference is here given to working substance pairings comprising water as component A). Particular preference is likewise given to working substance pairings comprising ammonia as component A).

Particular preference is likewise given to working substance pairings comprising at least 10% by weight, preferably at least 20% by weight, in particular at least 30% by weight, of working substance, based on the total weight of the working substance pairing, as component A).

Particular preference is likewise given to working substance pairings comprising not more than 90% by weight, preferably not more than 80% by weight, in particular not more than 70% by weight, of ionic liquid, based on the total weight of the working substance pairing, as component B).

Furthermore, particular preference is given to working substance pairings in which the working substance and the ionic liquid are miscible in the temperature range from −20 to 200° C., particularly preferably from −5 to 150° C. Particular preference is here given to working substance pairings in which the working substance is water.

Furthermore, particular preference is given to working substance pairings in which the working substance and the ionic liquid are miscible in the temperature range from −60 to 100° C., particularly preferably from −40 to 50° C. Particular preference is here given to working substance pairings in which the working substance is ammonia.

In a further embodiment, the ionic liquid can be applied to a suitable solid support.

The present invention further provides for the use of ionic liquids as absorption medium in absorption heat pumps, absorption refrigeration machines and heat transformers. With regard to the preferred embodiments, the above preferences apply analogously.

The invention is also directed at absorption heat pumps, absorption refrigeration machines and heat transformers which comprise a liquefier, an expansion organ, a boiler and an absorber and comprise an ionic liquid as absorption medium. With regard to the preferred embodiments, the above preferences with regard to the ionic liquids apply analogously.

The present invention is likewise directed at absorption heat pumps, absorption refrigeration machines and heat transformers which comprise a liquefier, an expansion organ, a stripper and an absorber and comprise a working substance pairing which in turn comprises a working substance and an ionic liquid. With regard to the preferred embodiments, the above preferences with regard to the working substance pairings apply analogously.

The present invention is illustrated by the following examples.

The ionic liquids used according to the invention have a negligibly small vapor pressure; working substance pairings according to the present invention which comprise ionic liquids and a working substance are therefore particularly useful—for example, separation problems as in the case of the ammonia/water working substance pairing are avoided.

The ionic liquids used according to the invention are liquid in the working range of the temperature range; working substance pairings according to the present invention which comprise ionic liquids and a working substance are therefore particularly useful since the problem of crystallizing salts does not occur. The total amount of the working substance, e.g. water, can thus be taken from the absorption medium and used for cooling (wide outgassing range). Furthermore, only the absorption medium itself, i.e. the ionic liquid, has to be cooled during transport of the absorption medium between stripper and absorber, i.e. the ionic liquid has to be cooled and not additionally the working substance as in the case of the substance pairing lithium bromide and water.

The miscibility of ionic liquids with working substances is ensured; thus, the ionic liquid ethylmethylimidazolium triflate can be mixed with water.

Furthermore, the heat resistance of ionic liquids is excellent; Blake et al., Proceedings of the 11th SolarPACES International Symposium, 2002, assume that temperatures of far above 300° C. can be achieved. Thus, the working substance pairings of the invention also have good stability and heat resistance.

Furthermore, the toxicity of ionic liquids which have been tested hitherto has been classified as low (e.g. $LD_{50}$>1000 mg/kg); owing to their virtually unmeasurable vapor pressure, they do not form potentially ignitable mixtures and therefore represent neither an explosion risk nor a toxicity problem.

It has also been found that the vapor pressure of water can be reduced by a factor of 4 on dissolution in ionic liquids, e.g. 2-hydroxyethylammonium formate.

For this purpose, the partial pressure of water over an aqueous 2-hydroxyethylammonium formate solution was determined at a customary phase equilibrium temperature (by means of FTIR spectroscopy in the gas phase).

At 30.5° C., the partial pressure of water over a solution comprising 84% by weight of 2-hydroxyethylammonium formate and 16% by weight of water was found to be about 10 mbar, while the partial pressure of water over water itself is about 40 mbar.

At a temperature of 34° C., the partial pressure of water over a solution comprising 87% by weight of 2-hydroxyethylammonium formate and 13% by weight of water was found to be about 12 mbar, while the partial pressure of water over water itself at this temperature is about 50 mbar.

In the case of an existing absorption refrigeration machine which has hitherto been operated using the working substance pairing lithium bromide/water, the working substance pairing mentioned can likewise be replaced by the system ionic liquid/water, for example N-ethyl-N-methylimidazolium tetrafluoroborate/water, without changes in the construction of the machine having to be undertaken to allow operation using the novel absorption media.

In a preferred embodiment, an absorption heat pump which is conventionally operated using the working substance pairing water/ammonia can be operated using the working substance pairing ionic liquid/ammonia. In this case, the otherwise customary rectification of the water/ammonia mixture becomes unnecessary, since the separation of the ammonia from the ionic liquid by vaporization of the ammonia is complete.

The invention claimed is:

1. An absorption heat pump, absorption refrigeration machine, or heat transformer comprising a working substance pairing, which comprises:
   A) a working substance selected from the group consisting of water, ammonia, and methanol; and
   B) an ionic liquid, which is a salt melt with a melting point below 80° C.

2. The absorption heat pump, absorption refrigeration machine, or heat transformer according to claim 1, wherein the ionic liquid is the salt of the general formula I, II or III B1) $[A]_n^+[Y]^{n-}$ (I)

where n is 1, 2, 3 or 4, $[A]^+$ is a quaternary ammonium cation, an oxonium cation, a sulfonium cation or a phosphonium cation and $[Y]^{n-}$ is a monovalent, divalent, trivalent or tetravalent anion;

B2) mixed salts of the general formulae (II)

$[A^1]^+[A^2]^+[Y]^{2-}$ (IIa);

$[A^1]^+[A^2]^+[A^3]^+[Y]^{3-}$ (IIb); or $[A^1]^+[A^2]^+[A^3]^+[A^4]^+[Y]^{4-}$ (IIc), where $[A^1]^+$, $[A^2]^+$, $[A^3]^+$ and $[A^4]^+$ are selected independently from among the groups mentioned for $[A]^+$ and $[Y]^{n-}$ is as defined under B1); or B3) mixed salts of the general formulae (III)

$[A^1]^+[A^2]^+[A^3]^+[M^1]^+[Y]^{4-}$ (IIIa);

$[A^1]^+[A^2]^+[M^1]^+[M^2]^+[Y]^{4-}$ (IIIb);

$[A^1]^+[M^1]^+[M^2]^+[M^3]^+[Y]^{4-}$ (IIIc);

$[A^1]^+[A^2]^+[M^1]^+[Y]^{3-}$ (IIId);

$[A^1]^+[M^1]^+[M^2]^+[Y]^{3-}$ (IIIe);

$[A^1]^+[M^1]^+[Y]^{2-}$ (IIIf);

$[A^1]^+[A^2]^+[M^4]^{2+}[Y]^{4-}$ (IIIg);

$[A^1]^+[M^1]^+[M^4]^{2+}[Y]^{4-}$ (IIIh);

$[A^1]^+[M^5]^{3+}[Y]^{4-}$ (IIIi); or $[A^1]^+[M^4]^{2+}[Y]^{3-}$ (IIIj)

where $[A^1]^+$, $[A^2]^+$ and $[A^3]^+$ are selected independently from among the groups mentioned for $[A]^+$, $[Y]^{n-}$ is as defined under B1) and $[M^1]^+$, $[M^2]^+$, $[M^3]^+$ are monovalent metal cations, $[M^4]^{2+}$ is a divalent metal cation and $[M^5]^{3+}$ is a trivalent metal cation; or a mixture thereof.

3. The absorption heat pump, absorption refrigeration machine, or heat transformer according to claim 1, comprising the ionic liquid of the formula I, II, or III as component B B1) $[A]_n^+[Y]^{n-}$ (I)

where n is 1, 2, 3 or 4, $[A]^+$ is a quaternary ammonium cation, an oxonium cation, a sulfonium cation or a phosphonium cation and $[Y]^{n-}$ is a monovalent, divalent, trivalent or tetravalent anion;

B2) mixed salts of the general formulae (II)

$[A^1]^+[A^2]^+[Y]^{2-}$ (IIa);

$[A^1]^+[A^2]^+[A^3]^+[Y]^{3-}$ (IIb); or $[A^1]^+[A^2]^+[A^3]^+[A^4]^+[Y]^{4-}$ (IIc), where $[A^1]^+$, $[A^2]^+$, $[A^3]^+$ and $[A^4]^+$ are selected independently from among the groups mentioned for $[A]^+$ and $[Y]^{n-}$ is as defined under B1); or B3) mixed salts of the general formulae (III)

$[A^1]^+[A^2]^+[A^3]^+[M^1]^+[Y]^{4-}$ (IIIa);

$[A^1]^+[A^2]^+[M^1]^+[M^2]^+[Y]^{4-}$ (IIIb);

$[A^1]^+[M^1]^+[M^2]^+[M^3]^+[Y]^{4-}$ (IIIc);

$[A^1]^+[A^2]^+[M^1]^+[Y]^{3-}$ (IIId);

$[A^1]^+[M^1]^+[M^2]^+[Y]^{3-}$ (IIIe);

$[A^1]^+[M^1]^+[Y]^{2-}$ (IIIf);

$[A^1]^+[A^2]^+[M^4]^{2+}[Y]^{4-}$ (IIIg);

$[A^1]^+[M^1]^+[M^4]^{2+}[Y]^{4-}$ (IIIh);

$[A^1]^+[M^5]^{3+}[Y]^{4-}$ (IIIi); or $[A^1]^+[M^4]^{2+}[Y]^{3-}$ (IIIj)

where $[A^1]^+$, $[A^2]^+$ and $[A^3]^+$ are selected independently from among the groups mentioned for $[A]^+$, $[Y]^{n-}$ is as defined under B1) and $[M^1]^+$, $[M^2]^+$, $[M^3]^+$ are monovalent metal cations, $[M^4]^{2+}$ is a divalent metal cation and $[M^5]^{3+}$ is a trivalent metal cation; or a mixture thereof.

4. The absorption heat pump, absorption refrigeration machine, or heat transformer according to claim 1, wherein the working substance and the ionic liquid are miscible in the temperature range from −20 to 200° C.

5. The absorption heat pump, absorption refrigeration machine, or heat transformer according to claim 1, wherein the working substance is water.

6. The absorption heat pump, absorption refrigeration machine, or heat transformer according to claim 1, wherein the working substance and the ionic liquid are miscible in the temperature range from −60 to 100° C.

7. The absorption heat pump, absorption refrigeration machine, or heat transformer according to claim 1, wherein the working substance is ammonia.

8. An absorption heat pump, absorption refrigeration machine, or heat transformer according to claim 1 further comprising:
a liquefier; an expansion organ; a boiler; and an absorber.

9. The absorption heat pump, absorption refrigeration machine, or heat transformer according to claim 1 wherein the absorption heat pump, absorption refrigeration machine or heat transformer is an absorption heat pump and the working substance is absorbed in the ionic liquid.

10. The absorption heat pump, absorption refrigeration machine, or heat transformer according to claim 1 wherein the absorption heat pump, absorption refrigeration machine or heat transformer is an absorption refrigeration machine and the working substance is absorbed in the ionic liquid.

11. The absorption heat pump, absorption refrigeration machine, or heat transformer according to claim 1 wherein the absorption heat pump, absorption refrigeration machine or heat transformer is an absorption heat transformer and the working substance is absorbed in the ionic liquid.

12. The absorption heat pump, absorption refrigeration machine, or heat transformer according to claim 1, wherein the ionic liquid is liquid in a temperature range from 0 to 180° C.

13. The absorption heat pump, absorption refrigeration machine, or heat transformer according to claim 1, wherein the working substance and the ionic liquid are miscible in the temperature range from −5 to 150° C.

14. The absorption heat pump, absorption refrigeration machine, or heat transformer according to claim 1, wherein the working substance and the ionic liquid are miscible in the temperature range from −40 to 50° C.

* * * * *